(12) United States Patent
Lee et al.

(10) Patent No.: US 11,498,372 B2
(45) Date of Patent: Nov. 15, 2022

(54) VEHICLE WHEEL INCLUDING WAVELENGTH TUBE MEMBER

(71) Applicants: Hyundai Motor Company, Seoul (KR); Kia Motors Corporation, Seoul (KR); Seowoo industry Co., Ltd., Gumi-si (KR); HYUNDAI SUNGWOO CASTING CO., LTD, Seoul (KR)

(72) Inventors: Jun-Min Lee, Seoul (KR); Young-Chan Kim, Suwon-si (KR); Min-Soo Kim, Seoul (KR); Young-Rae Jo, Seoul (KR); Jong-Ju Lee, Chungju-si (KR); Da-Woon Lim, Chungju-si (KR); Sang-Bum Park, Chungju (KR); Sung-Hoon Kim, Ansan-si (KR); Dong-Yong Shin, Seoul (KR); Jae-Hyun Hwang, Ulsan (KR); Ui-Min Jeong, Gumi-si (KR)

(73) Assignees: Hyundai Motor Company, Seoul (KR); Kia Motors Corporation, Seoul (KR); Seowoo industry Go., Ltd., Gumi-si (KR); HYUNDAI SUNGWOO CASTING CO., LTD, Seoul (KR)

(*) Notice: Subject to any disclaimer, the term of this patent is extended or adjusted under 35 U.S.C. 154(b) by 531 days.

(21) Appl. No.: 16/681,605

(22) Filed: Nov. 12, 2019

(65) Prior Publication Data
US 2020/0317006 A1 Oct. 8, 2020

(30) Foreign Application Priority Data
Apr. 3, 2019 (KR) .................. 10-2019-0038995

(51) Int. Cl.
*B60C 19/00* (2006.01)
*B60B 21/12* (2006.01)
*G10K 11/172* (2006.01)

(52) U.S. Cl.
CPC ............ *B60C 19/002* (2013.01); *B60B 21/12* (2013.01); *B60B 2310/3025* (2013.01); *B60B 2900/133* (2013.01); *G10K 11/172* (2013.01)

(58) Field of Classification Search
CPC ....... B60C 19/002; B60C 19/00; B60B 21/12; B60B 21/026; B60B 21/02;
(Continued)

(56) References Cited

U.S. PATENT DOCUMENTS 6,309,026 B1 * 10/2001 Svedhem ................ B60C 19/00
152/339.1
7,690,410 B2 * 4/2010 Kamiyama ............. B60B 21/12
301/6.91
(Continued)

FOREIGN PATENT DOCUMENTS

CN 210970534 U * 7/2020 ............. B60B 19/00
CN 114506181 A * 5/2022
(Continued)

*Primary Examiner* — Edgardo San Martin
(74) *Attorney, Agent, or Firm* — Morgan, Lewis & Bockius LLP (57) ABSTRACT

A vehicle wheel including a wavelength tube member may include spokes, a cylindrical rim configured to connect both circumferential portions of the spokes, and a wavelength tube member accommodated on the rim between the first and second circumferential portions of the spokes and configured to cancel sound wave generated in a cavity formed between the rim and a tire, wherein the wavelength tube member may include a rim seating portion being in surface-contact with and accommodated on an external
(Continued)

surface of the rim; and a plurality of wavelength tube portions formed on the rim seating portion.

12 Claims, 5 Drawing Sheets

(58) Field of Classification Search
CPC ...... B60B 2900/133; B60B 2310/3025; G10K 11/172; G10K 11/16; B60R 13/0884; B60R 13/08
See application file for complete search history.

(56) References Cited

U.S. PATENT DOCUMENTS

| | | | |
|---|---|---|---|
| 9,381,772 B2 * | 7/2016 | Rathje | B60B 21/12 |
| 9,399,372 B2 * | 7/2016 | Kamiyama | B60B 21/12 |
| 9,566,825 B2 * | 2/2017 | Kamiyama | B60B 21/12 |
| 9,604,583 B2 * | 3/2017 | Seo | B60R 13/0884 |
| 10,583,697 B2 * | 3/2020 | Miura | B60C 19/002 |
| 2015/0048669 A1 * | 2/2015 | Zhu | B60B 19/00 181/207 |

FOREIGN PATENT DOCUMENTS

| | | | | |
|---|---|---|---|---|
| EP | 0663306 A2 * | 7/1995 | ........... | B60C 19/002 |
| FR | 2805214 A1 * | 8/2001 | ........... | B60B 21/023 |
| JP | 2002178727 A * | 6/2002 | ........... | B60C 17/041 |
| JP | 2012245837 A * | 12/2012 | | |
| JP | 2015171876 A * | 10/2015 | | |
| KR | 1999-0070125 A | 9/1999 | | |
| KR | 20200032075 A * | 3/2020 | | |
| KR | 102110032 B1 * | 5/2020 | | |
| KR | 20210005342 A * | 1/2021 | | |
| KR | 102249427 B1 * | 5/2021 | | |
| WO | WO-2005021291 A1 * | 3/2005 | ........... | B60C 19/002 |
| WO | WO-2005068223 A1 * | 7/2005 | ............ | B60B 21/00 |
| WO | WO-2017138358 A1 * | 8/2017 | ............ | B60B 21/02 |

* cited by examiner

VEHICLE WHEEL INCLUDING WAVELENGTH TUBE MEMBER

CROSS-REFERENCE(S) TO RELATED APPLICATIONS

The present application claims priority to Korean Patent Application No. 10-2019-0038995, filed on Apr. 3, 2019, the entire contents of which is incorporated herein for all purposes by this reference.

BACKGROUND OF THE DISCLOSURE

Field of the Disclosure

The present invention relates to a wavelength tube member for a vehicle employed for reducing a noise generated in a cavity of a vehicle tire, and a vehicle wheel including the same.

Description of Related Art

Cavity resonance is a phenomenon in which a specific sound pressure distribution is formed in a cavity, which is blocked from an external space, by a boundary condition. For example, a sound pressure distribution formed in a pipe having both closed end portions is formed in a specific form. In a tire, an internal space of the tire coupled with a rim forms such the cavity, and the cavity has a donut shape. Therefore, when an external impact is applied to the tire, a specific sound pressure distribution is generated due to an interference phenomenon.

Such cavity resonance noise is the biggest cause of load noise of the vehicle, and various technologies for reducing the present cavity resonance noise have been developed and applied to the tire.

For example, there is a medium such as a dynamic damper of a suspension or a means such as acoustic absorbent/sound insulation material for a vehicle body.

However, these means have an effect of partially reducing the noise, but there is a limit that these means cannot solve the cavity resonance noise.

Furthermore, in the case of a sound-absorbing tire, a shape of the tire is limited, and if the consumable sound-absorbing tire is replaced with an ordinary tire, the effect cannot be sustained and there is a problem of an increase in manufacturing cost and an effect variation according to a temperature change.

Furthermore, although there is also a hollow sound-absorbing wheel in which a hollow portion is formed in the wheel itself, the present wheel has problems that an additional joining process is required, a defect rate is high, a manufacturing cost is increased, and the like.

The reason for the limitations of these related arts is that the vehicle, and the wheel and the tire applied to the vehicle may not only consider the cavity resonance noise, but also weight and a manufacturing cost, and productivity may be considered.

Figure 1:
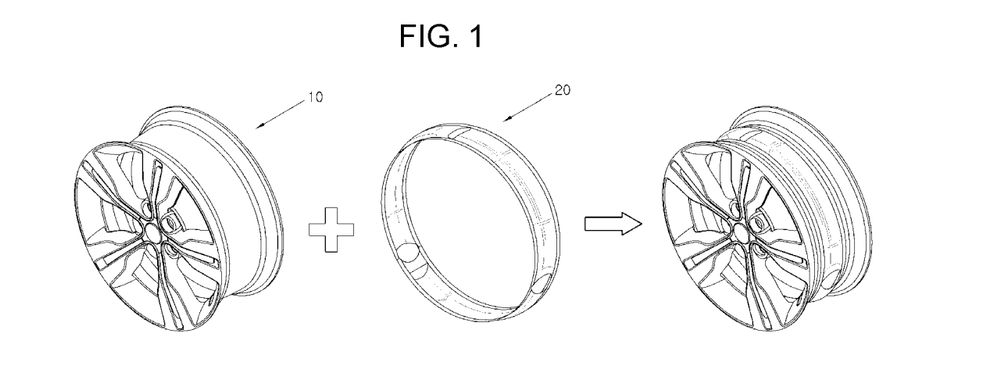
FIG. 1 is a diagram schematically illustrating a conventional wheel configured to reduce a cavity noise.

As a conventional technique for reducing the cavity noise considering the present point, there has been provided a technique in which a wavelength tube 20 configured to generate cancellation noise for reducing the cavity noise is joined to a rim portion of a wheel 10 as illustrated in FIG. 1. The present invention relates to a cavity noise reduction technique using such the wavelength tube.

A method illustrated in FIG. 1 is the method in which an adhesive is directly applied to only both longitudinal edge portions of the wavelength tube and the wavelength tube is then attached to a rim.

However, the present method has a limitation in that a process for applying the adhesive is necessarily required, curing takes a long time, and productivity is thus lowered.

Furthermore, since only both longitudinal edge portions of the wavelength tube are attached to the rim, the adhesive may deteriorate over time due to a surface state of a portion of the wavelength tube to be attached the rim, a surface condition of the rim and a lowering of an adhesive strength caused by an increase in an internal temperature. As a result, there is a possibility that the wavelength tube may be detached from the rim.

To solve the above problems, an expensive adhesive is employed. However, this also causes an increase in manufacturing cost.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a wavelength tube member for a vehicle, which is configured to allow a wavelength tube coupled with a wheel to be securely fixed without being detached, and a vehicle wheel including the same.

A vehicle wheel according to various aspects of the present invention may include spokes, a cylindrical rim configured to connect both circumferential portions of the spokes, and a wavelength tube member accommodated on the rim between the first and second circumferential portions of the spokes and configured to cancel sound wave generated in a cavity formed between the rim and a tire. Here, the wavelength tube member may include a rim seating portion being in surface-contact with and accommodated on an external surface of the rim, and a plurality of wavelength tube portions formed on the rim seating portion.

Meanwhile, the wavelength tube portion may have a tube configuration in which one end portion thereof is opened and the other end portion thereof is closed.

Furthermore, the rim may have a seating groove formed thereon along a circumferential direction of the cylindrical rim, and the rim seating portion may be inserted into the seating groove.

Also, the wavelength tube member may have a plurality of fixing portions formed to be protruded from the rim seating portion and extended in a lateral direction thereof, and the rim may have a plurality of fixing grooves formed on the external surface of the cylindrical rim and extended from the rim seating portion to allow the fixing portions to be inserted into the fixing grooves.

Furthermore, the fixing groove may be configured to allow an internal surface thereof to be inclined such that a width of the fixing groove becomes wide as the width of the fixing groove goes downwards.

Furthermore, the fixing portion may have a shape corresponding to a shape of the fixing groove and may be configured to allow an external surface thereof to be inclined such that a width of the fixing portion becomes wide as the width of the fixing groove goes downwards.

Next, a vehicle wheel according to another aspect of the present invention may include spokes, a cylindrical rim configured to connect both circumferential portions of the spokes, and a wavelength tube member accommodated on the rim between the first and second circumferential portions of the spokes and configured to cancel sound wave generated in a cavity formed between the rim and a tire. Here, the rim may have seating protrusions formed to be protruded and extending in a circumferential direction of the cylindrical rim, and spaced from each other in an axial direction of the rim by a distance corresponding to a width of the wavelength tube member.

Furthermore, the wavelength tube member may include a rim seating portion being in surface-contact with and accommodated on an external surface of the rim, and a plurality of wavelength tube portions formed on the rim seating portion.

Furthermore, the wavelength tube member may have a plurality of fixing portions protruded and extending from the rim seating portion in a lateral direction thereof, and each of the seating protrusions is partially divided into a plurality of segments to form a through space between the adjacent segments through which the fixing portion can pass.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

To fully understand the present invention, operational advantages of the present invention and objects achieved by implementing the present invention, reference may be made to the accompanying drawings illustrating exemplary embodiments of the present invention and the description on the accompanying drawings.

In describing the exemplary embodiments of the present invention, a description on well-known technologies or a repetitive description which may unnecessarily obscure the gist of the present invention will be abbreviated or omitted.

Hereinafter, the exemplary embodiments of the present invention will be described with reference to the accompanying drawings.

Figure 2:
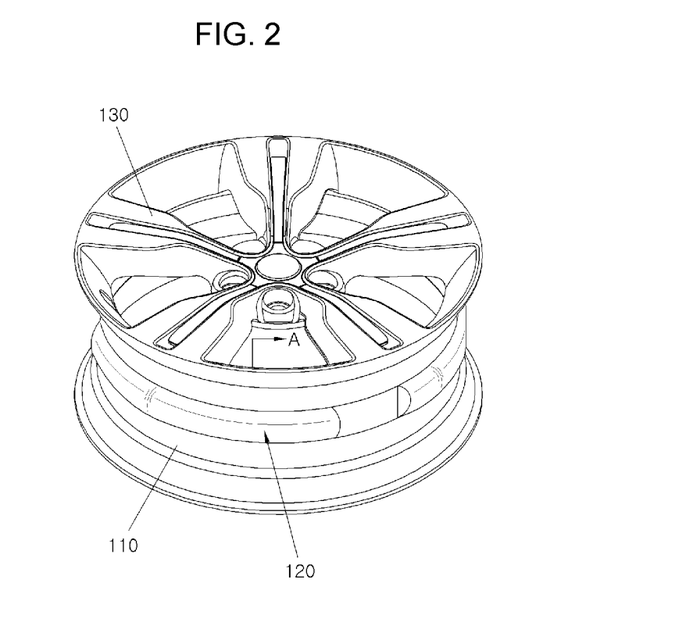
FIG. 2 is a diagram illustrating a vehicle wheel including a wavelength tube member according to various exemplary embodiments of the present invention.
Figure 3:
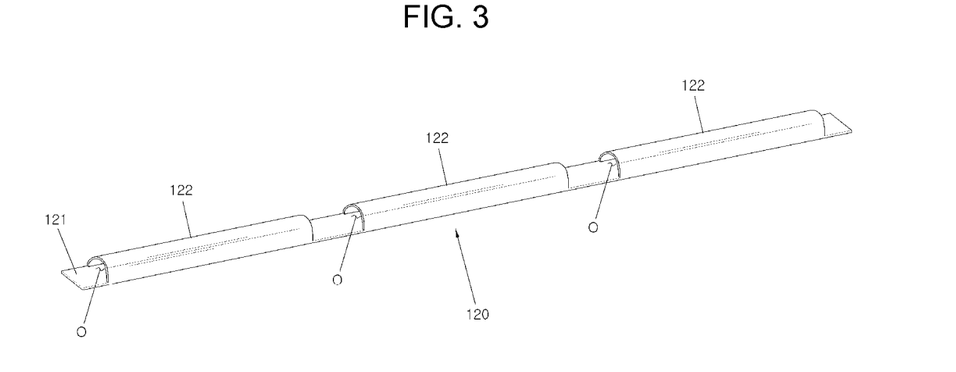
FIG. 3 is diagram separately illustrating the wavelength tube member according to the various exemplary embodiments of the present invention.
Figure 4:
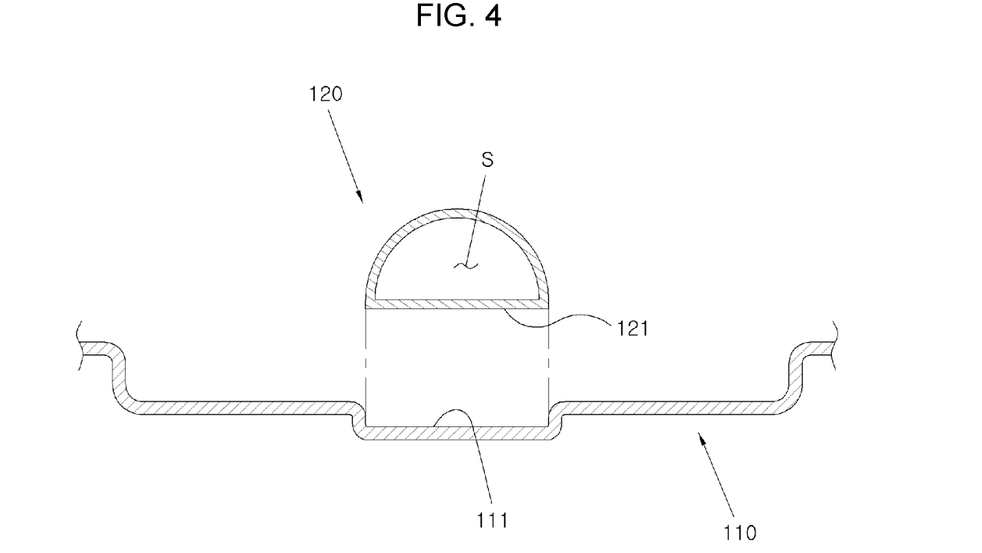
FIG. 4 is a cross-sectional view of the wavelength tube member viewed in a direction of A in FIG. 2.

FIG. 2 is a diagram illustrating a vehicle wheel including a wavelength tube member according to various exemplary embodiments of the present invention, FIG. 3 is diagram separately illustrating the wavelength tube member according to the various exemplary embodiments of the present invention, and FIG. 4 is a cross-sectional view of the wavelength tube member viewed in a direction of A in FIG. 2.

Hereinafter, a vehicle wheel including a wavelength tube member according to an exemplary embodiment of the present invention is described with reference to FIG. 2, FIG. 3 and FIG. 4.

A vehicle wheel of the present invention includes spokes 130 and a rim 110, and includes a wavelength tube member 120 for canceling noise generated in a cavity between a tire and the rim 110.

Each of the spokes 130 includes a circumferential portion corresponding to an internal diameter of the tire and a plurality of supporting portions extending from an axle toward the circumferential portion.

The plurality of supporting portions are provided at regular intervals, and the number and spacing may be varied depending on the wheel.

The rim 110 connects the circumferential portions of both spokes 130 of the wheel so that it is formed in a cylindrical shape.

Furthermore, the wavelength tube member 120 is accommodated on the rim 110, and the wavelength tube member 120 includes a rim seating portion 121 forming a lower surface to be accommodated on an external surface of the rim 111, and a plurality of wavelength tube portions 122 formed on the rim seating portion 121 and configured to cancel a sound wave.

The wavelength tube portion 122 forms a closed tube having one end portion which is opened and the other end portion which is closed. Hereinafter, for the sake of convenience, the open end portion is referred to as a front side O and the other closed end portion is referred to as a rear side C.

Furthermore, the wavelength tube portion forms a closed tube having a shape of a semicircle or an arc with respect to the front and rear sides and has an empty internal space S formed therein, and so that the wavelength tube portion generates sound wave having a phase opposite that of a cavity resonance noise entering the internal space to cancel the cavity resonance noise.

Referring to FIG. 4, a seating groove 111 is formed in the rim 110 along a circumference of the rim 110 and the rim seating portion 121 of the wavelength tube member 120, which has a width corresponding to that of the seating groove 111, is accommodated in the seating groove 111. The present configuration thus allows the wavelength tube member 120 to be maintained in an engagement between the wavelength tube member and the rim 10 without being detached from the rim.

Therefore, the wavelength tube member 120 comes in surface-contact with the rim 110, and so it is possible to prevent the wavelength tube member 120 from being lifted by wind pressure generated by a rotation of a wheel.

Figure 5:
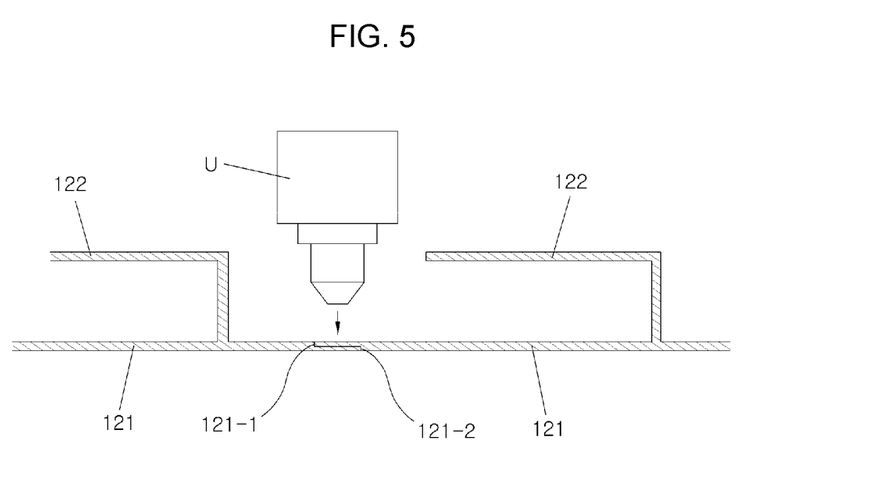
FIG. 5 is a diagram illustrating a process of joining the wavelength tube member of the present invention.

Furthermore, as illustrated in FIG. 5, both end portions 121-1 and 121-2 of the rim seating portion 121 are joined to each other, come in surface-contact and are fixed to the rim by an ultrasonic welder U without applying an adhesive.

The rim seating portion 121 and the wavelength tube portion 122 referred to as above may be formed of the same fiber material and integrally formed with other. Therefore, weight and manufacturing cost may be reduced in comparison with a metal material such as plastic or aluminum.

The waveguide member 120 may include a variety of fiber materials such as synthetic fiber, natural fibers or carbon fiber, and may be formed of polyethylene terephthalate (PET) material.

PET material is not only advantageous for weight reduction, but can also minimize generation of noise, vibration, harshness (NVH), and is an eco-friendly material which may be recycled.

Furthermore, PET material is not only excellent in sound absorption performance due to its porous property, but also has an advantage of excellent in chipping resistance, so that it is not broken even under strong impact.

Figure 6A:
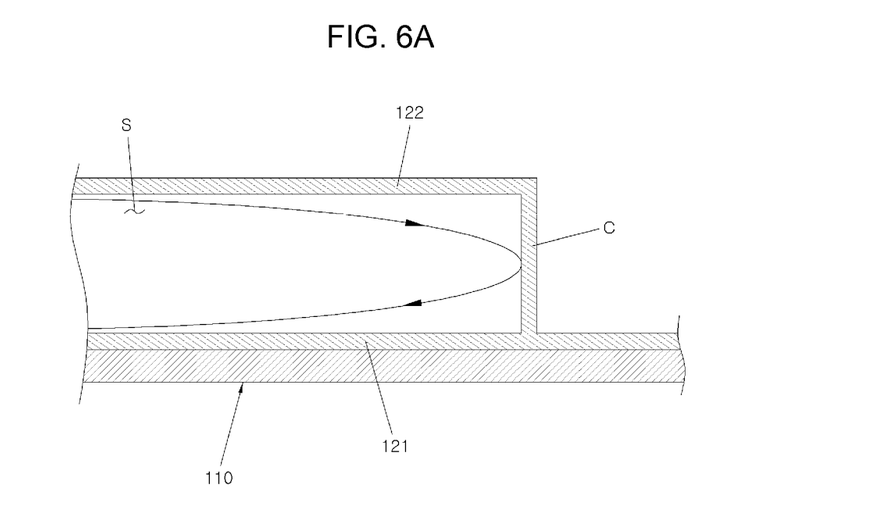
FIG. 6A and FIG. 6B are diagrams illustrating a process of canceling cavity noise conducted by the wavelength tube member of the present invention.
Figure 6B:
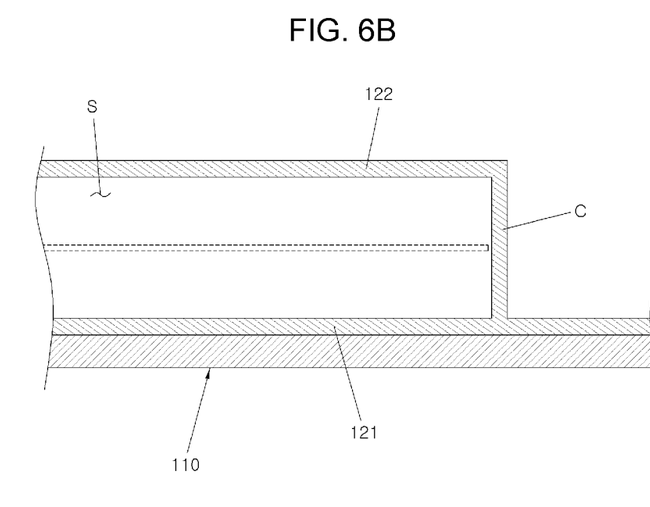

Due to the configuration constructed as above, the present invention allows the wavelength tube member to be stably fixed and the cavity resonance noise, which enters the internal space S as shown in FIG. 6A, to be canceled by the wavelength tube member as shown in FIG. 6B.

That is, as the vehicle is traveling, an impact is transmitted to the tire from the ground, and the tire is crushed, so that sound pressure a negative pressure is generated in the cavity. Due to the above, sound wave is generated and the sound wave is propagated in the cavity. At the instant time, when the sound wave corresponds to a specific frequency, the present sound wave forms a stationary wave and the present stationary wave is resonated to cause noise. This noise is called a cavity resonance noise and the present frequency is called a resonance frequency.

Assuming that the tire is cut and unfolded in a straight line, the cavity theoretically forms an opened tube configuration, and the stationary waves with various frequencies are generated in the opened tube.

The frequency corresponding to these the stationary waves is the resonance frequency, and various resonance frequencies are existed.

If a length of the unfolded tire is L, a wavelength of a sound wave is λ, and frequency is f, the stationary wave in the opened tube is generated at L=nλ/2 (where n is a natural number).

However, since the phases at a starting point and an ending point differ from each other, the stationary waves of L=λ/2, 3λ/2 and 5λ/2 are not formed in the wheel, and, among λ/2, 2λ/2 and 4λ/2, the frequency corresponding to 2λ/2 has the greatest influence on the noise, and thus the present frequency becomes the most problematic resonance frequency.

Thus, to cancel a sound wave with the resonance frequency corresponding to L=2λ/2, a ¼ wavelength tube generating an antiphase of the above resonance frequency is employed as the wavelength tube portion of the present invention.

That is, each of the plurality of wavelength tube portion has a length satisfying the above, and is in a shape of a tube in which one end portion thereof is opened and the other end portion thereof is closed.

In the case of the velocity of sound of v=340 m/s and a radius of the cavity of r=0.248 m (wheel of 18 inches), a length of the wavelength tube canceling the sound wave of the resonance frequency to be eliminated is determined as follows.

$$L = 2\pi r = \frac{2}{2}\lambda \quad \text{Equation 1}$$

$$v = f \times \lambda = 2\pi r \quad \text{Equation 2}$$

$$f = \frac{v}{2\pi r} = \frac{340}{2 \times \pi \times 0.258} = 210 \text{ Hz} \quad \text{Equation 3}$$

$$\lambda = \frac{v}{f} = \frac{340}{210} = 1.62 \text{ (m)} \quad \text{Equation 4}$$

That is, it may be seen that the resonance frequency, the wavelength and λ/4 corresponding to the length of L=λ are 210 Hz, 1.62 m and 0.405 m, respectively, as the results of the above equations.

Thus, in the case of the 18-inch wheel (cavity) of the above example, the wavelength tube of the present invention is made to have a length of 0.405 m to reduce the cavity resonance noise.

Figure 7:
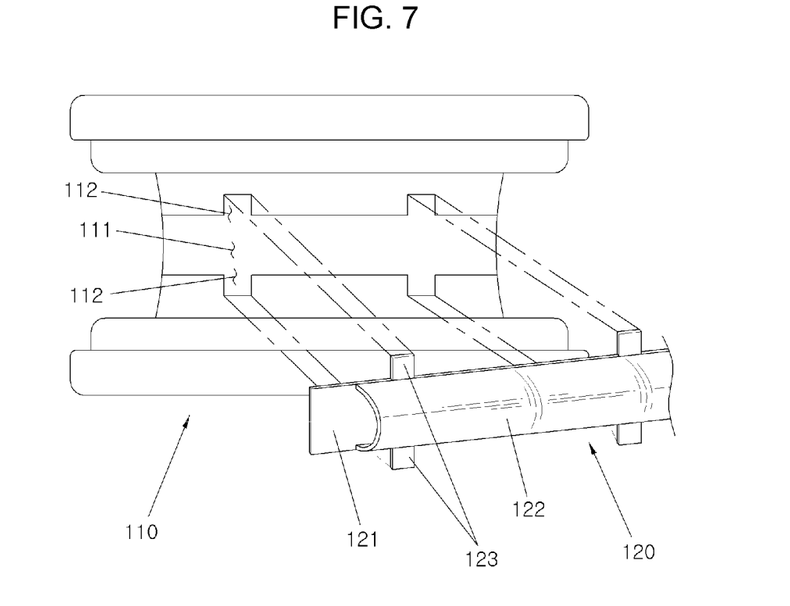
FIG. 7 is a diagram illustrating a vehicle wheel including a wavelength tube member according to various exemplary embodiments of the present invention.

Next, FIG. 7 is a diagram illustrating a vehicle wheel including a wavelength tube member according to various exemplary embodiments of the present invention. Hereinafter, the wavelength tube member according to the various exemplary embodiments of the present invention is described with reference to FIG. 7, but the description on the same configuration as that of the various exemplary embodiments will be omitted.

The various exemplary embodiments of the present invention is directed to further strengthen an engagement between the wavelength tube member and the wheel, and to minimize motion of the wavelength tube member in a circumferential direction of the rim.

To the present end, a plurality of fixing portion 123 protruded and extending from the rim seating portion 121 in a lateral direction are formed on the wavelength tube member 120.

As shown in the drawing, it is more preferable to form the fixing portions in both lateral directions.

Furthermore, a plurality of fixing grooves 112 having the number and a size corresponding to those of the fixing portions 123 are formed in the rim 110 and extending from the rim seating portion 121.

Due to the above configuration, the wavelength tube member 120 accommodated on the rim 110 may be more securely fixed.

Figure 8:
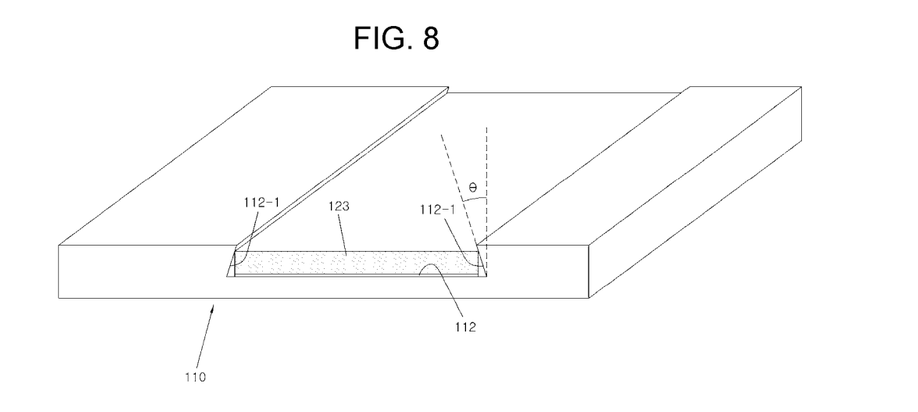
FIG. 8 is a diagram illustrating a vehicle wheel including a wavelength tube member according to a first application example of the various exemplary embodiments of the present invention.
Figure 9:
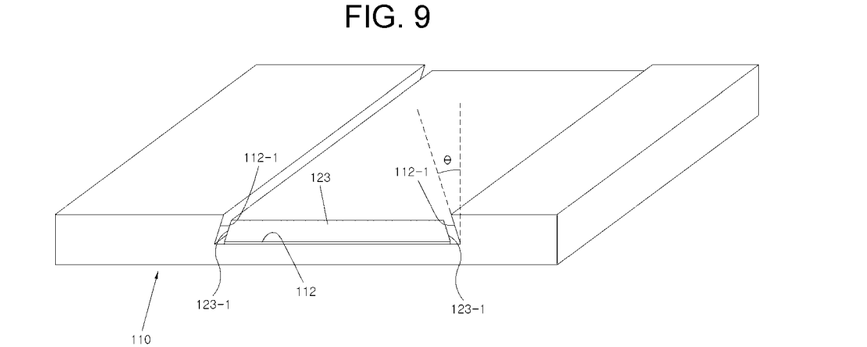
FIG. 9 is a diagram illustrating a vehicle wheel including a wavelength tube member according to a second application example of the various exemplary embodiments of the present invention.

FIG. 8 and FIG. 9 are diagrams showing application examples of the various exemplary embodiments of the present invention, and showing cross-sectional shapes thereof As shown in FIG. 8, a fixing groove 112-1 may be configured to allow an internal surface thereof to be inclined at an inclination angle θ so that a width thereof becomes wide as the width of the fixing groove goes downwards. Due to the present configuration, it is possible to make a detachment of the fixing portion 123 inserted into the fixing groove 112-1 more difficult.

Furthermore, as shown in FIG. 9, a fixing portion 123-1 also has a shape corresponding to that of the above fixing groove 112-1 and may be configured to allow an external surface thereof to be inclined so that a width thereof becomes wide as the width of the fixing groove goes downwards.

In the application example of FIG. 9, it is possible to prevent the wavelength tube member 120 from being detached in a circumferential direction of the rim 110 and to securely fix the wavelength tube member without lifting.

Figure 10:
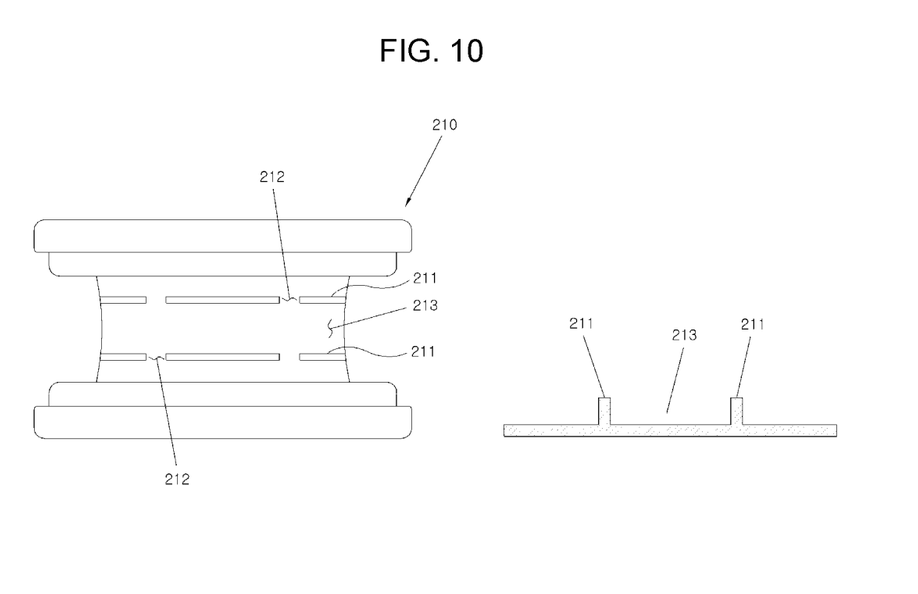
FIG. 10 is a diagram illustrating a vehicle wheel including a wavelength tube member according to various exemplary embodiments of the present invention.

Finally, FIG. 10 is a diagram illustrating a vehicle wheel including a wavelength tube member according to various exemplary embodiments of the present invention.

On a rim 210 of the wheel according to the various exemplary embodiments of the present invention, in place of the seating grooves 111 described above, seating protrusions 211 are protrudingly formed, extending in a circumferential direction and are spaced from each other in an axial direction of the rim by a distance corresponding to a width of the wavelength tube member 120 to allow the wavelength tube member 120 to be accommodated on a seating surface 213.

Meanwhile, the fixing portion 123 may be formed on the wavelength tube member 120 as described above. In the instant case, each of the seating protrusions 211 is configured to be divided into a plurality of segments and to form a through space 212 between the adjacent segments. Accordingly, each of the fixing portion 123 can pass through the through segment to be fixed.

The present invention allows the wavelength tube member to be stably fixed to the wheel through the above-described embodiments, making it possible to solve the cavity resonance noise.

According to the vehicle wheel including the wavelength tube member of the present invention, since the noise generated in the cavity is canceled, a load noise is canceled to provide convenience for the users.

Furthermore, since the rim seating portion of the wavelength tube member is stably accommodated on the rim portion of the wheel, it is possible to prevent the wavelength tube from being lifted due to wind pressure generated by a rotation of the wheel.

Despite the present configuration, no separate adhesive is required for attaching and sealing the wavelength tube, therefore, manufacturing cost and time may be saved.

Furthermore, it is possible for an exemplary embodiment of the present invention to easily apply to the conventional wheel, and an increase in weight of the wheel may be minimized.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle wheel including a wavelength tube member, the vehicle wheel comprising:
   spokes;
   a cylindrical rim connecting first and second circumferential portions of the spokes; and
   the wavelength tube member accommodated on the cylindrical rim between the first and second circumferential portions of the spokes and configured to cancel sound wave generated in a cavity formed between the cylindrical rim and a tire,
   wherein the wavelength tube member includes:
      a rim seating portion being in contact with and accommodated on an external surface of the cylindrical rim; and
      a plurality of wavelength tube portions formed on the cylindrical rim seating portion,
   wherein the wavelength tube member further includes a plurality of fixing portions formed to be protruded from the rim seating portion and extending in an axial direction of the cylindrical rim,
   wherein the cylindrical rim has a plurality of fixing grooves formed on the external surface of the cylindrical rim and extending from a seating groove in the axial direction of the cylindrical rim to allow the fixing portions to be inserted into the fixing grooves, and
   wherein each of the fixing grooves is configured to allow an internal surface thereof to be inclined such that a width of the fixing grooves becomes wide as the width of the fixing grooves goes downwards.

2. The vehicle wheel of claim 1, wherein each of the plurality of wavelength tube portions is spaced from each adjacent wavelength tube portion along the cylindrical rim in a circumferential direction of the cylindrical rim.

3. The vehicle wheel of claim 1, wherein each of the wavelength tube portions is in a shape of a tube in which a first end portion thereof is opened and a second end portion thereof is closed.

4. The vehicle wheel of claim 3, wherein the cylindrical rim has the seating groove formed thereon along a circumferential direction of the cylindrical rim, and the rim seating portion is inserted and mounted into the seating groove.

5. The vehicle wheel of claim 1,
wherein the fixing portions have a shape corresponding to a shape of the fixing grooves and is configured to allow an external surface thereof to be inclined such that a width of the fixing portions becomes wide as the width of the fixing grooves go downwards.

6. A vehicle wheel including a wavelength tube member, the vehicle wheel comprising:
spokes;
a cylindrical rim connecting first and second circumferential portions of the spokes; and
the wavelength tube member accommodated on the cylindrical rim between the first and second circumferential portions of the spokes and configured to cancel sound wave generated in a cavity formed between the cylindrical rim and a tire,
wherein the cylindrical rim has seating protrusions formed to be protruded and extending in a circumferential direction of the cylindrical rim, and spaced from each other in the circumferential direction of the cylindrical rim by a distance corresponding to a width of the wavelength tube member,
wherein the wavelength tube member further includes a plurality of fixing portions formed to be protruded from a rim seating portion and extending in an axial direction of the cylindrical rim, and
wherein the cylindrical rim has a plurality of fixing grooves formed on an external surface of the cylindrical rim and extending from a seating groove in the axial direction of the cylindrical rim to allow the fixing portions to be inserted into the fixing grooves,
wherein each of the fixing grooves is configured to allow an internal surface thereof to be inclined such that a width of the fixing grooves becomes wide as the width of the fixing grooves goes downwards.

7. The vehicle wheel of claim 6, wherein the wavelength tube member includes:
a rim seating portion being in contact with and accommodated on an external surface of the cylindrical rim between the seating protrusions; and
a plurality of wavelength tube portions formed on the rim seating portion.

8. The vehicle wheel of claim 7, wherein each of the plurality of wavelength tube portions is spaced from each adjacent wavelength tube portion along the cylindrical rim in the circumferential direction of the cylindrical rim.

9. The vehicle wheel of claim 7, wherein each of the wavelength tube portions is in a shape of a tube in which a first end portion thereof is opened and a second end portion thereof is closed.

10. The vehicle wheel of claim 9, wherein the cylindrical rim has the seating groove formed thereon along the circumferential direction of the cylindrical rim, and the rim seating portion is inserted and mounted into the seating groove.

11. The vehicle wheel of claim 6,
wherein the fixing portions have a shape corresponding to a shape of the fixing grooves and is configured to allow an external surface thereof to be inclined such that a width of the fixing portions becomes wide as the width of the fixing grooves go downwards.

12. The vehicle wheel of claim 7, wherein each of the seating protrusions is partially divided into a plurality of segments to form a through space between adjacent segments through which the fixing portions are configured to pass.

* * * * *